(12) United States Patent
Matsui

(10) Patent No.: US 7,675,539 B2
(45) Date of Patent: Mar. 9, 2010

(54) CAMERA CONTROL APPARATUS, CAMERA SYSTEM, ELECTRONIC CONFERENCE SYSTEM, AND CAMERA CONTROL METHOD

(75) Inventor: Takeshi Matsui, Kanagawa (JP)

(73) Assignee: Sony Corporation, Tokyo (JP)

( * ) Notice: Subject to any disclaimer, the term of this patent is extended or adjusted under 35 U.S.C. 154(b) by 1095 days.

(21) Appl. No.: 11/328,258

(22) Filed: Jan. 10, 2006

(65) Prior Publication Data

US 2006/0187306 A1    Aug. 24, 2006

(30) Foreign Application Priority Data

Jan. 17, 2005   (JP)   ............................ P2005-009417

(51) Int. Cl.
*H04N 7/15*   (2006.01)
(52) U.S. Cl. .................................................. 348/14.08
(58) Field of Classification Search .............. 348/14.08, 348/14.09
See application file for complete search history.

(56) References Cited

U.S. PATENT DOCUMENTS

| | | | | |
|---|---|---|---|---|
| 5,206,721 A | * | 4/1993 | Ashida et al. ............... | 348/14.1 |
| 5,742,329 A | * | 4/1998 | Masunaga et al. ......... | 348/14.07 |
| 6,593,956 B1 | * | 7/2003 | Potts et al. ................ | 348/14.09 |
| 6,795,558 B2 | * | 9/2004 | Matsuo ..................... | 348/14.09 |
| 2001/0028395 A1 | * | 10/2001 | Kawai et al. ............. | 348/14.16 |
| 2002/0101505 A1 | * | 8/2002 | Gutta et al. .............. | 348/14.07 |

* cited by examiner

*Primary Examiner*—Stella L Woo
(74) *Attorney, Agent, or Firm*—Oblon, Spivak, McClelland, Maier & Neustadt, L.L.P.

(57) ABSTRACT

A camera control apparatus includes a storage section storing, for each person to be photographed, face direction information when each face of a plurality of persons to be photographed by a camera is positioned in the central portion of a photographing range by the camera; a face position detection section detecting a position of a face of a person from a photographed image signal of the camera; a registration section computing face direction information on the basis of a detection result by the face position detection section and information indicating a current photographing direction of the camera and registering the face direction information in the storage section; and a driving control section reading face direction information corresponding to a person specified by an operation input from a user and controlling the driving apparatus in accordance with the face direction information in order to change the photographing direction of the camera.

12 Claims, 9 Drawing Sheets

PAN/ZOOM OPERATION CONTROL INFORMATION (Pdeg, Zdeg)
BASED ON ANGLE FORMAT

TILT OPERATION CONTROL INFORMATION (Tdeg) BASED ON ANGLE FORMAT

CAMERA CONTROL APPARATUS, CAMERA SYSTEM, ELECTRONIC CONFERENCE SYSTEM, AND CAMERA CONTROL METHOD

CROSS REFERENCES TO RELATED APPLICATIONS

The present invention contains subject matter related to Japanese Patent Application JP 2005-009417 filed in the Japanese Patent Office on Jan. 17, 2005, the entire contents of which are incorporated herein by reference.

BACKGROUND OF THE INVENTION

1. Field of the Invention

The present invention relates to a camera control apparatus for controlling a photographing range of a camera including a driving apparatus for changing a photographing direction, to a camera system and an electronic conference system including the camera control apparatus, and to a camera control method. More particularly, the present invention relates to a camera control apparatus having improved convenience of an operation for changing a photographing direction of a camera, a camera system, an electronic conference system, and a camera control method.

2. Description of the Related Art

In recent years, a television conference system capable of holding a conference at a remote location by mutually transmitting and receiving signals of collected audio and a photographed image at a conference via a communication line has attracted attention. In such a system, it is preferable that a speaking person is photographed and an image signal thereof can be transmitted to the other party. For that purpose, it has been necessary to switch a camera by an operation from a person or necessary to direct a camera towards a speaking person.

Meanwhile, a technology for automatically recognizing a person, etc., from an image signal has been used in various apparatuses. For example, as disclosed in U.S. Patent No. 2003-0142209, there is a known moving-body image monitoring apparatus for detecting a moving body, such as a person, from a difference between two frames that are adjacent in relation to time and for tracking the moving body by moving the photographing direction of a camera. Furthermore, as disclosed in GB Patent No. 2,343,945, there is a known photographing apparatus in which a face of a person within a photographing range is detected and tracked. Also, feature information of that face is stored, the feature information of a person photographed thereafter is compared with the stored feature information, and a warning can be given with respect to a dangerous person.

SUMMARY OF THE INVENTION

In the above-described television conference system, it is preferable that a speaking person be photographed with a simple operation or automatically and an image signal thereof can be transmitted to the other party. For that purpose, a camera including a mechanism for changing the photographing direction should be used to construct a system for directing the camera to the direction of a speaker by electronic control. However, in an operation technique for gradually changing the photographing direction and a zoom magnification ratio of the camera, there is the problem in that, for quickly moving the photographing direction and reliably projecting a speaking person in the central portion of the screen, the burden on the operator is large. If the position information of the speaker is stored in advance and each speaking person is automatically photographed by reading the position information by operating a button, etc., the operation becomes simplified. However, for that purpose, it is necessary to pre-store the position of the speaker before the system is used, and the operation is troublesome.

The present invention has been made in view of such points. It is desirable to provide a camera control apparatus capable of reliably photographing one person among a plurality of persons by a simple operation by using a camera without performing an operation for registering a photographing direction for each person.

It is desirable to provide a camera system capable of reliably photographing one person among a plurality of persons by a simple operation by using a camera without performing an operation for registering a photographing direction for each person.

It is desirable to provide an electronic conference system including a camera system capable of reliably photographing one person among a plurality of persons by a simple operation by using a camera without performing an operation for registering a photographing direction for each person.

It is desirable to provide a camera control method capable of reliably photographing one person among a plurality of persons by a simple operation by using a camera without performing an operation for registering a photographing direction for each person.

According to an embodiment of the present invention, there is provided a camera control apparatus for changing a photographing range of a camera including a driving apparatus for changing a photographing direction, the camera control apparatus including: a storage section storing, for each person to be photographed, face direction information when each face of a plurality of persons to be photographed by the camera is positioned in the central portion of a photographing range by the camera; a face position detection section detecting a position of a face of a person from a photographed image signal of the camera; a registration section computing the face direction information on the basis of a detection result by the face position detection section and information indicating a current photographing direction of the camera and registering the face direction information in the storage section; and a driving control section reading face direction information corresponding to a person specified by an operation input from a user and controlling the driving apparatus in accordance with the face direction information in order to change the photographing direction of the camera.

In such a camera control apparatus, the storage section stores face direction information corresponding to each person to be photographed, and the driving control section reads, from the storage section, face direction information corresponding to a person specified by an operation input from a user in order to control the driving apparatus in accordance with the face direction information. As a result, by only specifying, for example, a person by user operation, the photographing direction of the camera is changed so that the face of the specified person is positioned in the center of the screen. Furthermore, the face position detection section detects a position of a face of a person from a photographed image signal of the camera. The registration section computes face direction information on the basis of the detection result and information indicating the current photographing direction of the camera and stores the face direction information in the storage section. As a result, the face direction information corresponding to the photographed person is automatically registered in the storage section.

According to another embodiment of the present invention, there is provided a camera control method for controlling a photographing range of a camera including a driving apparatus for changing a photographing direction, the camera control method including the steps of: detecting a position of a face of a person from a photographed image signal of the camera; on the basis of the detection result by the detection step and information indicating the current photographing direction of the camera, computing face direction information when each face of a plurality of persons to be photographed by the camera is positioned in the center of the photographing range by the camera and registering, for each detected person, the face direction information in a database; and reading, from the database, face direction information corresponding to a person specified by an operation input from a user and controlling the driving apparatus in accordance with the face direction information in order to change the photographing direction of the camera.

In such a camera control method, the registration step stores face direction information corresponding to each person to be photographed in a database. The driving control step reads, from the database, face direction information corresponding to a person specified by an operation input from a user in order to control the driving apparatus in accordance with the face direction information. As a result, by only specifying, for example, a person by user operation, the photographing direction of the camera is automatically changed so that the face of the specified person is positioned in the center of the screen. Furthermore, the detection step detects the position of the face of the person from a photographed image signal of the camera. On the basis of the detection result and information indicating the photographing direction of the camera, the registration section computes direction information and registers the face direction information in the database. As a result, the face direction information corresponding to the photographed person is automatically registered in the database.

DESCRIPTION OF THE PREFERRED EMBODIMENTS

Embodiments of the present invention will now be described below in detail with reference to the drawings. In the following description, a case is assumed in which the present invention is applied to a camera system used in a television conference system.

First Embodiment

Figure 1:
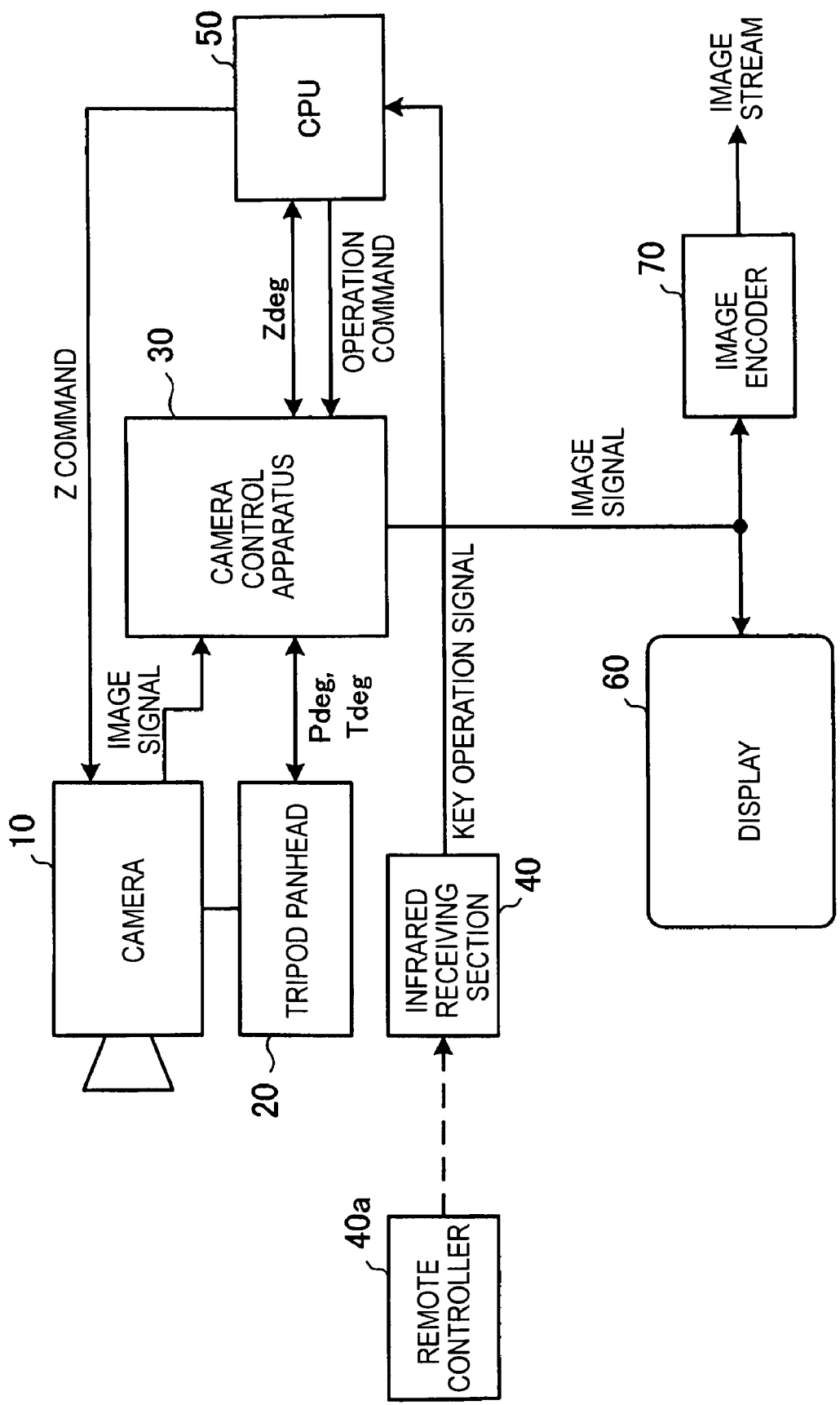
FIG. 1 shows a system configuration of a camera system according to a first embodiment of the present invention.

FIG. 1 shows a system configuration of a camera system according to a first embodiment of the present invention.

The camera system shown in FIG. 1 is designed to photograph a plurality of persons attending a conference by using one camera 10. This system includes a camera 10 having a zoom function, a tripod panhead 20 for changing the photographing direction of the camera 10, a camera control apparatus 30 for controlling the operation of the tripod panhead 20, an infrared receiving section 40 for receiving an infrared signal from a remote controller 40a, a CPU 50 for centrally controlling the overall system, a display 60 for displaying a photographed image, etc., and an image encoder 70 for compressing and coding an image signal.

In the camera 10, the photographing direction thereof is changed in a horizontal or vertical direction by the tripod panhead 20, and the focal length of a zoom lens is controlled in accordance with a control signal (zoom command) from the CPU 50. This camera 10 supplies a photographed image signal to the camera control apparatus 30. The tripod panhead 20 receives control information (Pdeg, Tdeg (to be described later)) indicating the photographing direction with respect to the horizontal/vertical direction from the camera control apparatus 30 and is driven in accordance with the values thereof. The current values of Pdeg and Tdeg can be notified to the camera control apparatus 30.

The camera control apparatus 30 controls the operation of the tripod panhead 20 in accordance with an operation command with respect to a pan/tilt operation from the CPU 50. Furthermore, the camera control apparatus 30 supplies a photographed image signal by the camera 10 to the display 60 and the image encoder 70.

In addition to this, the camera control apparatus 30 has a function for holding positions of faces of a plurality of persons as a database and for controlling the tripod panhead 20 and zoom operation so that any desired face is automatically photographed at a specified size in accordance with an operation command and a function for recognizing the face of the person from the photographed image signal and registering/updating the position information thereof. For the purpose of those functions, it is possible to obtain the current values of Pdeg and Tdeg from the tripod panhead 20, to obtain the current control value (Zdeg (to be described later)) of the zoom operation from the CPU 50, and to output the value of Zdeg to the CPU 50 in order to control the zoom operation of the camera 10.

The infrared receiving section 40 receives infrared signals for controlling the driving of the tripod panhead 20 and the zoom function of the camera 10 from the remote controller 40a and supplies key operation signals corresponding to these signals to the CPU 50. The CPU 50 outputs an operation command with respect to the pan/tilt operation to the camera control apparatus 30 in accordance with the key operation signal and also outputs a zoom control signal to the camera 10 in order to control the rotation operation of the tripod panhead 20 and the zoom operation of the camera 10. Furthermore, there are cases in which the zoom operation of the camera 10 is controlled in accordance with Zdeg from the camera control apparatus 30.

The display 60 receives a photographed image signal by the camera 10 and displays the current photographed image, etc., in a conference room, etc. The image encoder 70 compresses and codes the photographed image signal from the camera control apparatus 30 and generates an image stream. The generated image stream is multiplexed by a transmission apparatus (not shown) together with an audio stream collected simultaneously in the conference room, the image stream is transmitted to the conference room at a remote location via the communication line, and the image and the voice at the conference room on the transmission side are played back in real time. Furthermore, the image and audio streams that are captured and collected in the conference room at a remote location are received by a receiving apparatus (not shown). The decoded image and voice are simultaneously played back by the display 60 and the speaker, respectively. This makes it possible to hold a conference while viewing screens of the conference rooms at a remote location.

Figure 2:
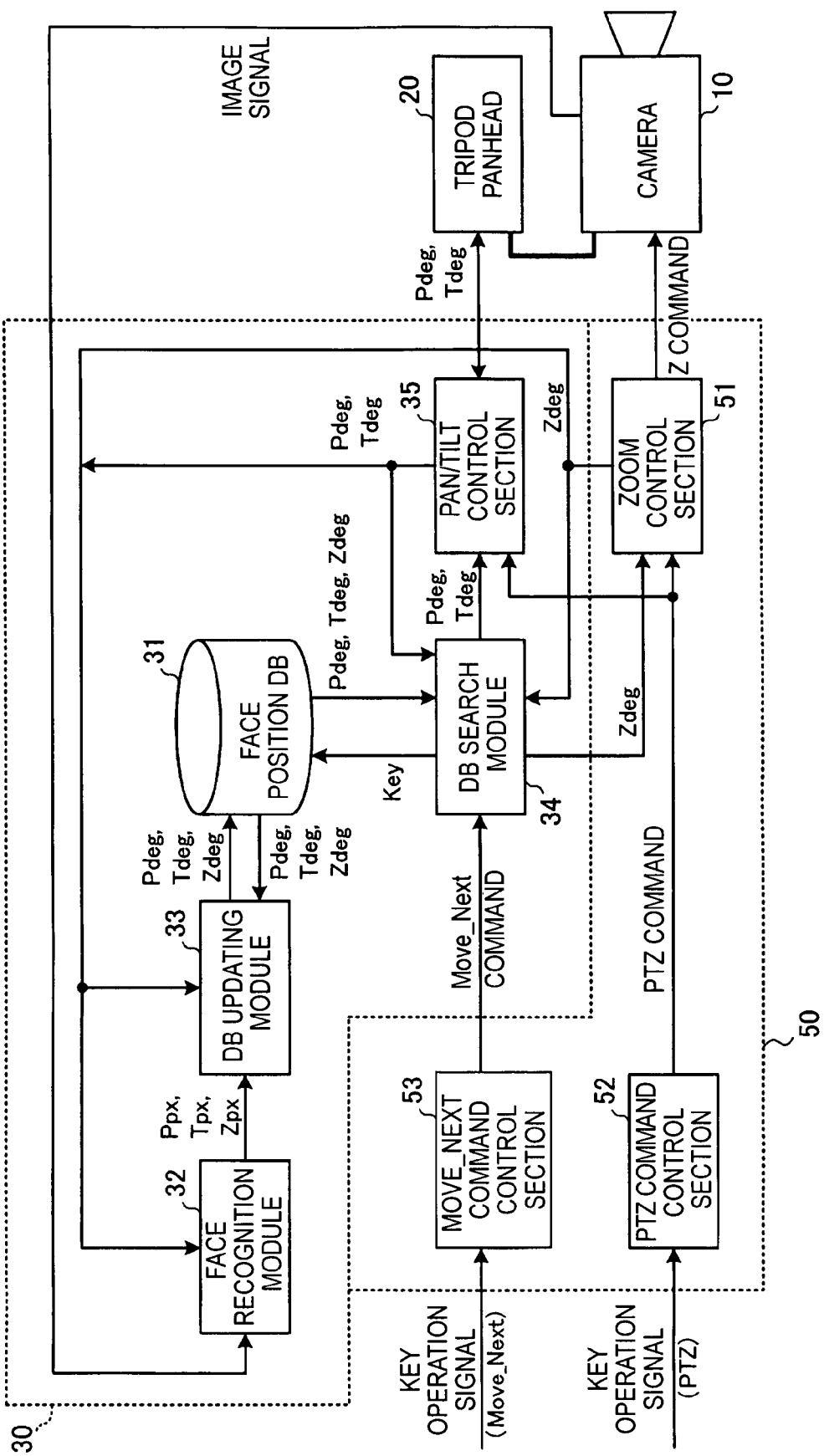
FIG. 2 is a block diagram showing functions for camera control provided in a camera control apparatus and a CPU.

FIG. 2 is a block diagram showing functions for camera control provided in the camera control apparatus 30 and the CPU 50.

As shown in FIG. 2, the camera control apparatus 30 includes a face position database 31, a face recognition module 32, a database updating module 33, a database search module 34, and a pan/tilt control section 35. The CPU 50 includes a zoom control section 51, a PTZ (PAN, TILT, ZOOM) command control section 52, and a Move_Next command control section 53.

The face position database 31 is a database in which control information for the rotation operation of the tripod panhead 20 and for the zoom operation of the camera 10 when the faces of participants of the conference are projected in the center of the screen at a predetermined size is stored for each participant. As will be described later with reference to FIGS. 3A and 3B, the control information is formed of data (Pdeg, Tdeg, Zdeg) in which the photographing direction of the camera 10 with respect to the horizontal and vertical directions and the zoom operating state of the camera 10 are represented by the angle format.

The face recognition module 32 detects the position of the face of the person from the digital image signal photographed by the camera 10 by using an image recognition technology and computes the face position information (Ppx, Tpx, Zpx) in a coordinate format.

The database updating module 33 converts face position information (Ppx, Tpx, Zpx) computed by the face recognition module 32 into an angle format and registers the face position information in the face position database 31. Furthermore, even while photographing is being performed by the camera 10, the database updating module 33 updates as desired the content of the face position database 31 on the basis of the face position information from the face recognition module 32.

The database search module 34 is a function block for controlling the photographing direction and the zoom operation of the camera 10 by using the stored information of the face position database 31. The database search module 34 extracts, from the face position database 31, the face position information (Pdeg, Tdeg, Zdeg) corresponding to the participant positioned adjacent to the participant being currently displayed in accordance with the direction indication information from the Move_Next command control section 53, and controls the photographing direction and the zoom operation via the pan/tilt control section 35 and the zoom control section 51 in accordance with the information.

The pan/tilt control section 35 outputs a control signal to the tripod panhead 20 in accordance with the operation command from the PTZ command control section 52 or in accordance with control information (Pdeg, Tdeg) from the database search module 34 in order to control the pan/tilt operation of the tripod panhead 20. Similarly, the zoom control section 51 outputs a control command to the camera 10 in order to control the zoom operation in accordance with the operation command from the PTZ command control section 52 or in accordance with control information (Zdeg) from the database search module 34.

The PTZ command control section 52 generates an operation command in accordance with a key operation signal from the infrared receiving section 40, and outputs a command for the pan/tilt operation to the pan/tilt control section 35 and outputs a command for a zoom operation to the zoom control section 51. The Move_Next command control section 53 similarly outputs an operation command in accordance with the key operation signal from the infrared receiving section 40 and outputs the operation command to the database search module 34.

Here, the remote controller 40a according to this embodiment includes a PTZ key for gradually changing the pan/tilt direction and the zoom magnification ratio and a Move_Next key for specifying a direction in which another person adjacent to the person currently being photographed is specified by using the face position database 31.

Then, as a result of performing an input operation to the PTZ key, key operation signals indicating the pan/tilt direction and the expansion/reduction of the zoom magnification ratio are supplied to the CPU 50 via the infrared receiving section 40. The PTZ command control section 52 issues a PTZ command in accordance with these signals. As a result, the pan/tilt control section 35 controls the tripod panhead 20 in order to gradually change the direction of the camera 10 in accordance with the PTZ command, and the zoom control section 51 gradually enlarges or reduces the zoom magnification ratio of the camera 10 in accordance with the PTZ command.

On the other hand, as a result of performing an input operation to the Move_Next key, key operation signals indicating the direction of each of left and right are supplied to the CPU 50 via the infrared receiving section 40. The Move_Next command control section 53 issues a Move_Next command indicating the direction of either left or right in accordance with these signals. As a result, the database search module 34 extracts the face position information corresponding to the adjacent person in the indicated direction from the face position database 31, and outputs the information to the pan/tilt control section 35 and the zoom control section 51, enabling the face of the adjacent person to be automatically photographed.

As a result of operating the Move_Next key in this manner, it is possible for the operator of the camera system to switch from the state in which one participant of the conference is photographed to a state in which another participant is photographed by a simple operation. As a consequence, it becomes not necessary to manually adjust the photographing direction and the zoom magnification ratio of the camera 10 while viewing the display 60.

Figure 3A:
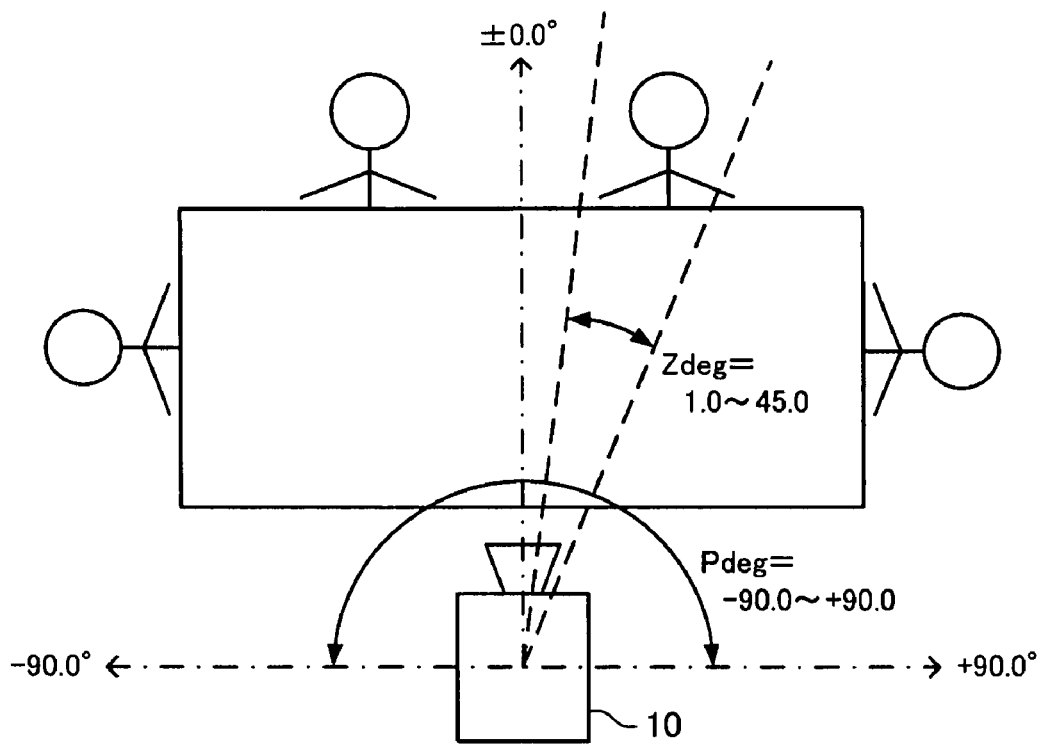
FIGS. 3A and 3B illustrate control information for pan/tilt/zoom operation.
Figure 3B:
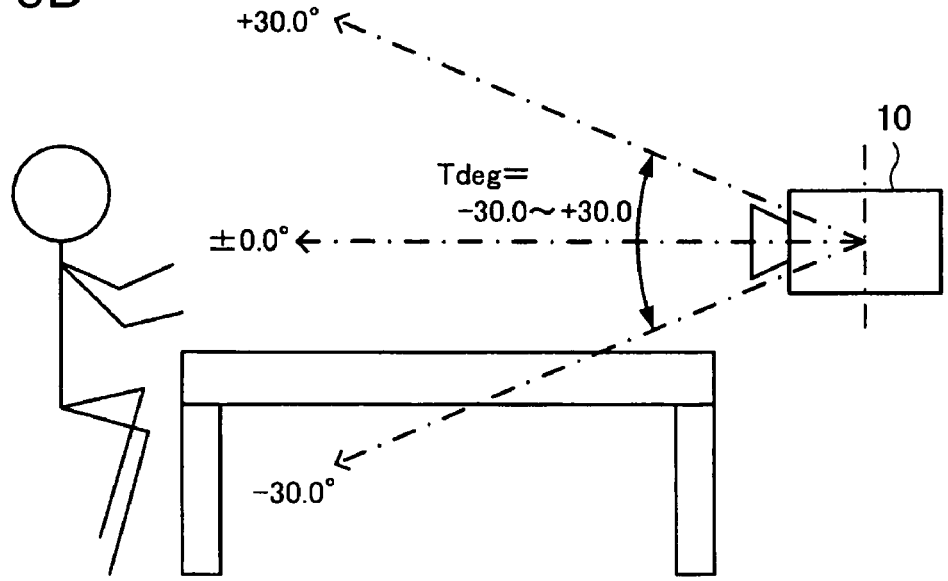

FIGS. 3A and 3B illustrate control information (Pdeg, Tdeg, Zdeg) for the pan/tilt/zoom operation.

In this embodiment, the control information of the pan/tilt/zoom operation is represented by Pdeg, Tdeg, and Zdeg in which the photographing direction of the camera 10 with respect to the horizontal and vertical directions and the zoom operating state of the camera 10 are represented by an angle format. Regarding the rotation operation (pan operation) in the horizontal direction, as shown in FIG. 3A, the rotational angle of the tripod panhead 20 is set at, for example, 180° at a maximum, and the angle (−90.0° to +90.0°) of the straight line connecting the rotation center of the tripod panhead 20 to the center point of the face of the person to be photographed is made to be the control information (Pdeg) of the pan operation. Similarly, regarding the rotation operation (tilt operation) in the vertical direction, as shown in FIG. 3B, the rotational angle of the tripod panhead 20 is set at, for example, 60° at a maximum, and the angle (−30.0° to +30.0°) of the straight line connecting the rotation center of the tripod panhead 20 to the center point of the face is made to be the control information (Tdeg) of the tilt operation.

Furthermore, the control information (Zdeg) of the zoom operation, as shown in FIG. 3A, is represented as the viewing angle of the camera 10. In FIG. 3A, the viewing angle is made to be in the range of 1.0° to 45.0°. The smaller the value, the more the zoom state becomes toward the telephoto side, and the subject is enlarged.

These pieces of the control information are supplied to the pan/tilt control section 35 and the zoom control section 51 for controlling a pan/tilt/zoom operation. Together with this, the face position information of each person stored in the face position database 31 is made to be a set of these pieces of angle information (Pdeg, Tdeg, Zdeg}. The information of the zoom operation in the face position database 31 is made to be a viewing angle when, for example, the face of the person is displayed fully on the screen.

Figure 4:
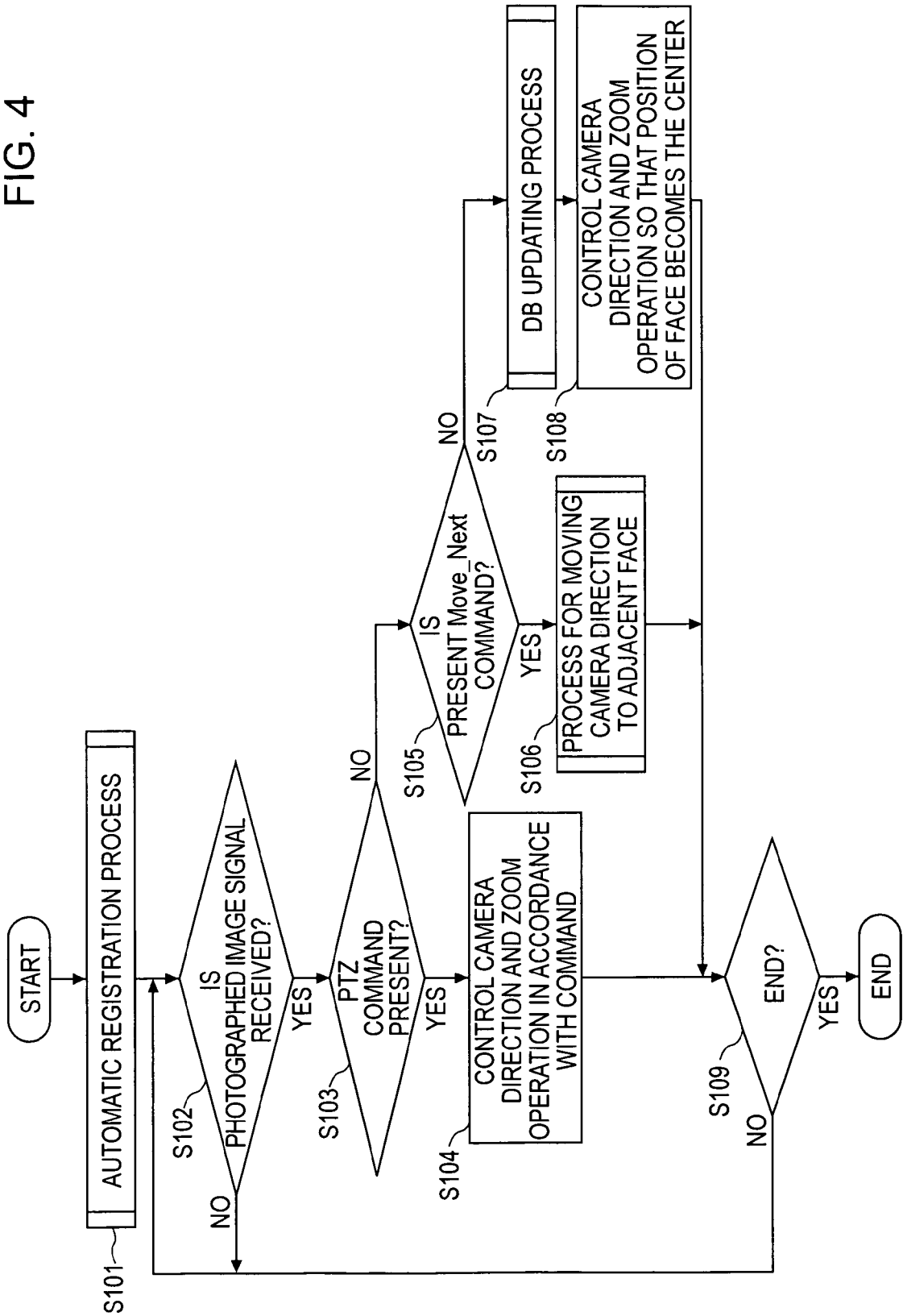
FIG. 4 is a flowchart showing the flow of the overall processing of the camera system.

Next, the operation of the camera system will be described specifically with reference to flowcharts. FIG. 4 is a flowchart showing the flow of the overall processing of the camera system.

[Step S101] A process for automatically registering face position information in the face position database 31 is performed. This process is a process in which, when the camera system is begun to be used, the face of the person within a photographable range is automatically recognized by using an image recognition technology while changing the photographing direction of the camera 10 under the control of, for example, the CPU 50, and those pieces of the face position information are registered in the face position database 31. This process will be described with reference to FIG. 5 below.

[Step S102] A photographed image signal for one frame is output by the camera 10, and the process waits for the face recognition module 32 to receive this signal. Upon receiving the signal, the process proceeds to step S103.

[Step S103] When there is a PTZ command in an execution wait state, the pan/tilt control section 35 and the zoom control section 51 receive a PTZ command from the PTZ command control section 52. The process then proceeds to step S104. When there is no PTZ command, the process proceeds to step S105.

[Step S104] In accordance with the received PTZ command, the pan/tilt control section 35 controls the tripod panhead 20 so that the photographing direction of the camera 10 is changed for one step. Furthermore, the zoom control section 51 changes the zoom magnification ratio of the camera 10 for one step. Thereafter, the process proceeds to step S109.

[Step S105] When there is a Move_Next command in an execution wait state, the database search module 34 receives a Move_Next command from the Move_Next command control section 53, and the process then proceeds to step S106. When there is no Move_Next command, the process proceeds to step S107.

[Step S106] The database search module 34 performs a process for moving the direction of the camera 10 so that the face of the person adjacent in the direction specified by the command is photographed. Then, after the process is completed, the process proceeds to step S109. The process of step S106 will be described in detail with reference to FIG. 7.

[Step S107] When neither the PTZ command nor the Move_Next command is received, the face recognition module 32 and the database updating module 33 perform a process for updating the face position database 31 by using image recognition with respect to the range currently being photographed. This process will be described in detail with reference to FIG. 6.

[Step S108] The database search module 34 extracts once more the face position information of the face currently being photographed from the updated face position database 31, controls the direction of the camera 10 so that the face becomes positioned in the center of the screen, and further controls the zoom operation so that the face on the screen becomes a predetermined size. In the process of step S107, when faces of a plurality of persons are recognized from within the screen in which photographing is being performed, control is performed in such a manner that, among the faces, the face in which the value of Pdeg is closest to the center of the screen is photographed. After the above-described processes are completed, the process proceeds to step S109.

[Step S109] The CPU 50 determines whether or not the completion of the processing is requested by, for example, a power-off operation. If not, the process returns to step S102.

In the above processes with reference to the flowcharts, in an example, a process corresponding to one operation command is performed in a synchronization period (vertical synchronization period) for one frame of the image signal. When the PTZ command is received, the state of the pan/tilt/zoom operation for one step is changed in accordance with the PTZ command (step S104). When the Move_Next command is received, the pan/tilt/zoom operation is automatically controlled so that the face of the adjacent person in the specified direction is photographed (step S106).

When, for example, the rotational speed of the tripod panhead 20 is slow and the operation takes a longer time than the vertical synchronization period until the adjacent face is photographed, the execution of the process corresponding to the reception of the next command and the database updating process in step S107 may be placed in hold until that operation is completed.

When neither the PTZ command nor the Move_Next command is received for a fixed period of time, that is, when the photographing direction and the zoom lens position of the camera 10 are stopped, image recognition is performed on the basis of the photographed image signal, and the stored information within the face position database 31 with respect to the photographed range is updated (step S107). As a result, when the seat of the participant of the conference is moved and/or the number of participants is increased or decreased, the face position database 31 is automatically updated.

Furthermore, the direction and the zoom magnification ratio of the camera 10 are corrected on the basis of the updated face position information so that the face currently being photographed is moved to the center of the screen (step S108). For this reason, the camera 10 follows the exact movements of the participant of the conference, the face may be projected in the center, and thus the quality of the image generated is improved. The state in which anyone's face is not projected is avoided, and a useless image signal is not transmitted.

Figure 5:
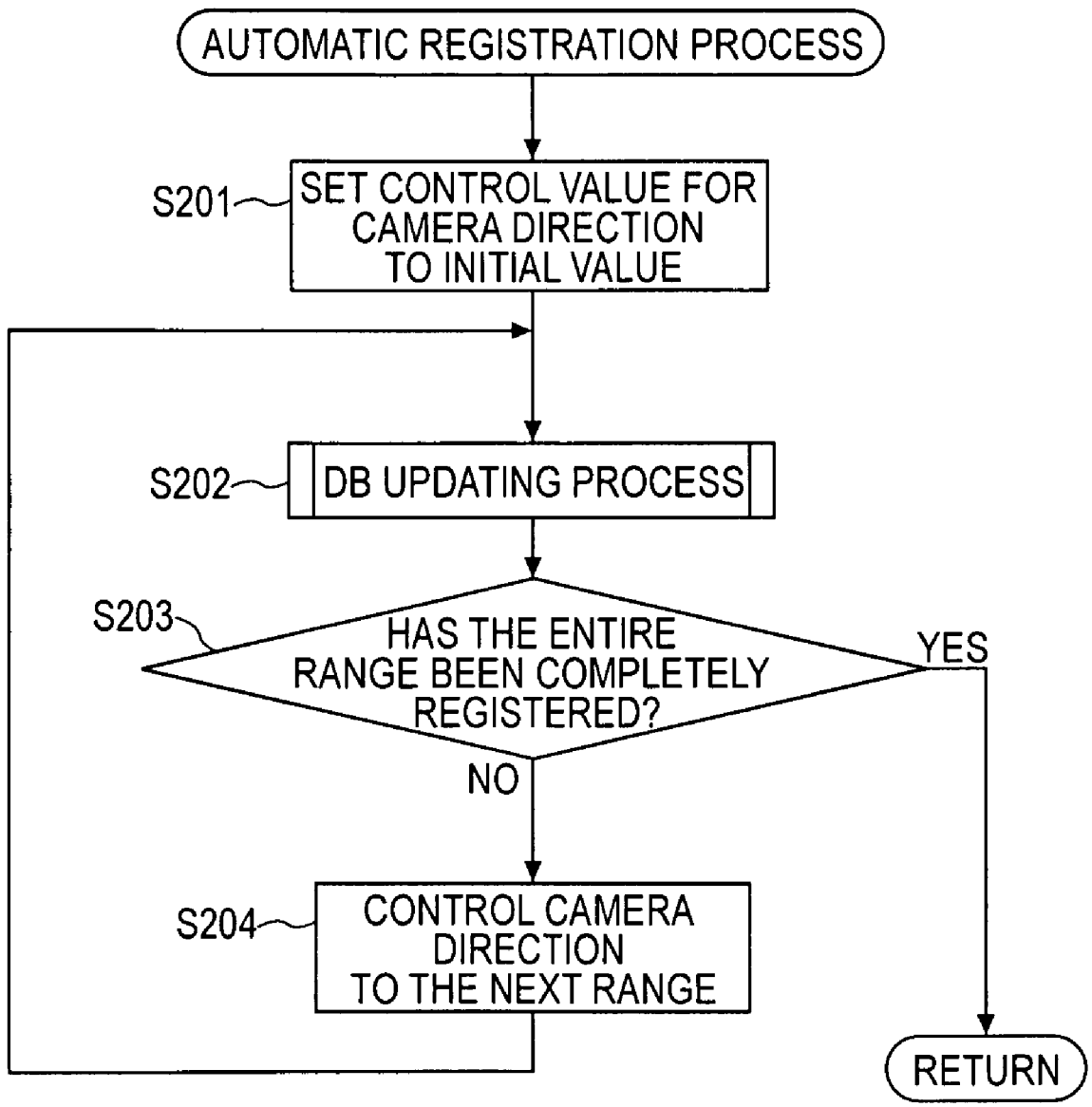
FIG. 5 is a flowchart showing the flow of an automatic registration process of a face position database.

FIG. 5 is a flowchart showing the flow of an automatic registration process of the face position database 31.

[Step S201] The pan/tilt control section 35 sets the control value of the tripod panhead 20, indicating the photographing direction of the camera 10, to an initial value. For example, the pan/tilt control section 35 controls so that the camera 10 is directed towards the upper leftmost of the photographing range. During this process, the zoom control section 51 controls the camera 10 so that a zoom state on the most wide-angle side is reached.

[Step S202] The face recognition module 32 and the database updating module 33 perform a process for updating the face position database 31 by using image recognition with respect to the range currently being photographed. Here, the face position information with respect to the corresponding range is newly registered. The process of step S202 is identical to that of step S107 of FIG. 4, and this process will be described in detail with reference to FIG. 6 below.

[Step S203] The pan/tilt control section 35 performs face position detection by using image recognition with respect to the entire photographable range and determines whether or not the face position information is updated. When there is a range in which image recognition is not performed, the process proceeds to step S204. When the face position detection is completely performed on the entire range, the initial operation is completed. Then, the process proceeds to step S102 of FIG. 4, where a normal operation is started.

[Step S204] The pan/tilt control section 35 controls the direction of the camera 10 so that the next photographing range where face position detection is not performed is photographed. Thereafter, the process returns to step S202, where face position detection with respect to the current range is performed and the corresponding face position information is registered.

As a result of the processes of the above flowcharts, it is possible to photograph the entire photographable range using the camera 10, to automatically detect the position of the face of the person present in that range, and to register the face position information of the face in the face position database 31.

Figure 6:
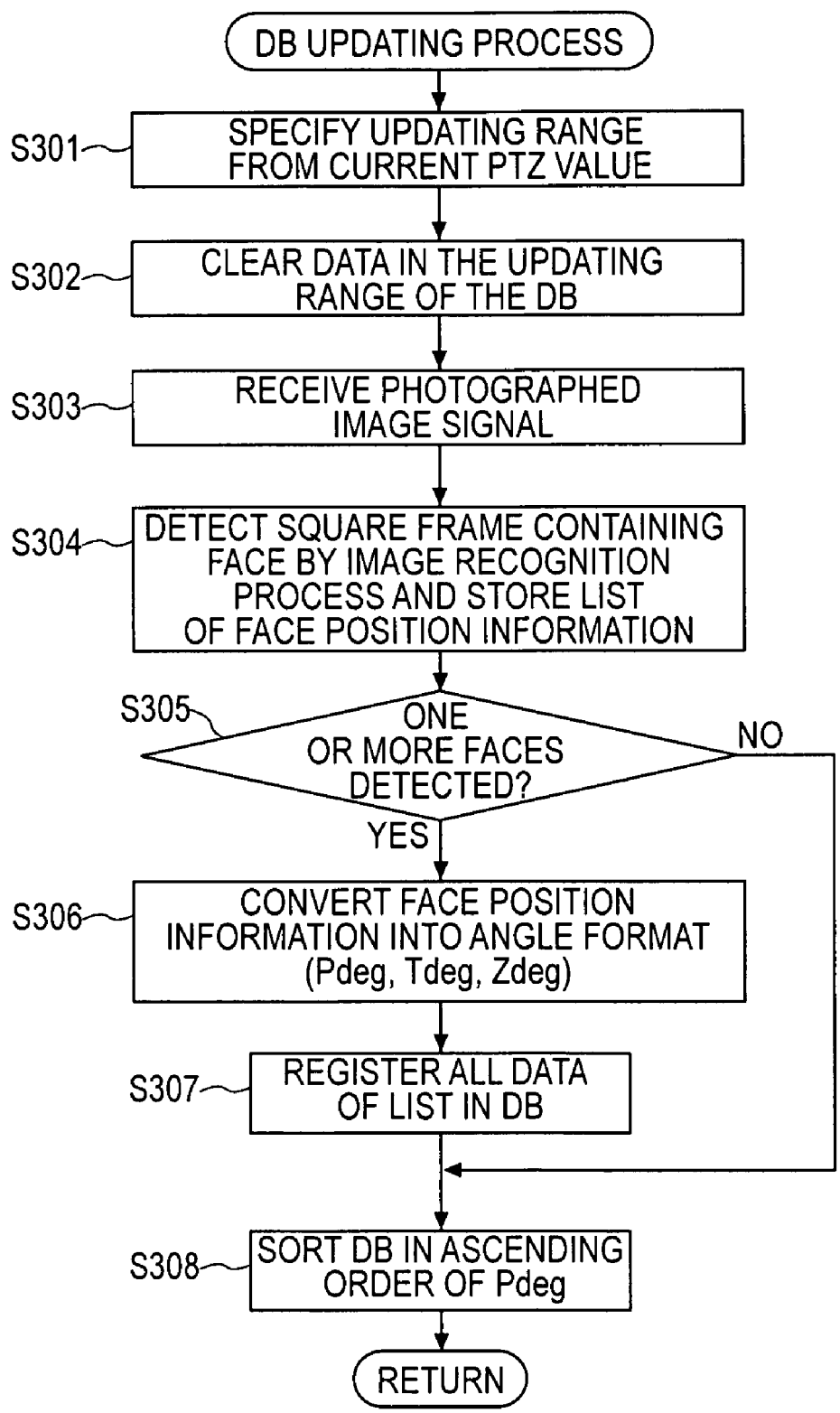
FIG. 6 is a flowchart showing the flow of an updating process of the face position database.

FIG. 6 is a flowchart showing the flow of an updating process of the face position database 31.

[Step S301] The database updating module 33 obtains the current Pdeg and Tdeg from the tripod panhead 20 via the pan/tilt control section 35, and obtains the current Zdeg from the zoom control section 51. Then, on the basis of these pieces of the control information, the range to be updated (corresponding to the range currently being photographed) is specified.

[Step S302] The database updating module 33 clears the stored data within the updating range in the face position database 31.

[Step S303] The face recognition module 32 receives a photographed image signal from the camera 10. When this step is performed in step S107 in FIG. 4, since the photographed image signal has already been received in step S102 described above, this step may be omitted.

[Step S304] The face recognition module 32 performs an image recognition process by using the received image signal, and detects the position of the face. Here, the position of the face is detected from the image signal for one frame. Examples of an image recognition technique that can be applied to this embodiment include a technique for detecting the flesh-color distribution on the basis of the color information of the image signal in order to specify the range containing the contour of the face and for comparing the contour line in that range and the positions of parts such as eyes and mouths with the template of a plurality of prestored face forms in order to determine the presence or absence of the existence of a face. Also, by receiving photographed image signals for a plurality of frames in steps S102 and S303 described below, an image recognition technique using a difference between frames can be used.

When one or more faces are detected, a square frame in which each face can be contained is generated, the coordinates (pixel number) on the screen at the center position of the square frame are set as face position information (Ppx, Tpx) in the horizontal and vertical directions, and the length of one side (number of pixels) of the square frame is set as data (Zpx) corresponding to the zoom operation. Then, the list of this face position information (Ppx, Tpx, Zpx) is temporarily stored.

For example, in the case of an image of a CIF (Common Intermediate Format) size of 352×288 pixels, Ppx takes a value of 0 to 351, and Tpx takes a value of 0 to 287. Zpx is set to, for example, a value of 20 to 200.

[Step S305] When one or more human faces are detected in step S304, the process proceeds to step S306. If not, the process proceeds to step S308.

[Step S306] On the basis of the current values of Pdeg, Tdeg, and Zdeg, the database updating module 33 converts the face position information (Ppx, Tpx, Zpx) in a coordinate format, which is stored in the face recognition module 32, into face position information (Pdeg, Tdeg, Zdeg) in an angle format.

For example, when the current Pdeg, Tdeg, and Zdeg are −30.0, +10.0, and +40.0, respectively, Pdeg at the left end of the photographed image is −30.0−40.0/2=−50.0; Pdeg at the right end is −30.0+40.0/2=−10.0; Tdeg at the upper end is +10.0+(40.0×¾)/2=+25.0; and Tdeg at the lower end is +10.0−(40.0×¾)/2=−5.0. Therefore, by causing these values to correspond to the coordinate values at the end portions of the image in a linear manner, the face position information (Ppx, Tpx, Zpx) in a coordinate format can be converted into face position information (Pdeg, Tdeg, and Zdeg) in an angle format.

[Step S307] The database updating module 33 registers the list of the face position information that is converted into an angle format in the face position database 31.

[Step S308] The face position database 31 sorts the stored face position information in ascending order of Pdeg.

As a result of the processes of the above flowcharts, only the face position information contained in the range currently being photographed is updated. For example, when a plurality of faces are detected in the photographing range, all the face position information of them is registered in the face position database 31. When a face is not detected by image recognition, the face position information corresponding to that range is deleted from the face position database 31. Then, since the face position information after being updated is sorted in ascending order of Pdeg, in the camera direction movement process corresponding to the Move_Next command (to be described later), the face position information of the adjacent face can be extracted efficiently.

Figure 7:
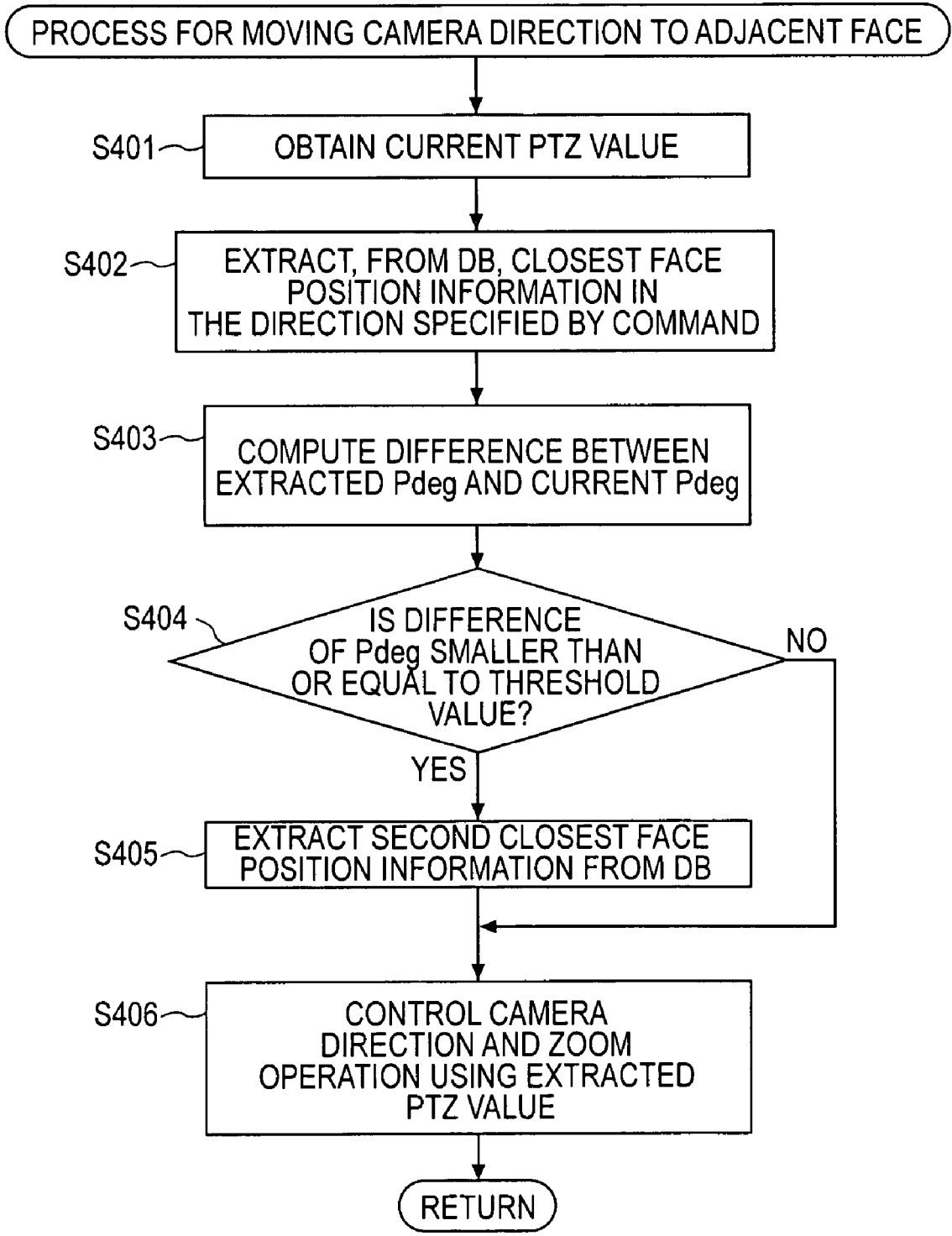
FIG. 7 is a flowchart showing the flow of a process for moving a camera direction to an adjacent face.

FIG. 7 is a flowchart showing the flow of a process for moving camera direction to an adjacent face.

[Step S401] The database search module 34 obtains the current Pdeg and Tdeg from the tripod panhead 20 via the pan/tilt control section 35 and obtains the current Zdeg from the zoom control section 51.

[Step S402] The database search module 34 searches the face position database 31 and extracts the face position information having Pdeg closest to the value of the current Pdeg.

[Step S403] The database search module 34 computes the difference between Pdeg of the extracted face position information and the current Pdeg.

[Step S404] When the absolute value of the difference of Pdeg is smaller than or equal to a predetermined threshold value, the process proceeds to step S405. When the value exceeds a threshold value, the process proceeds to step S406.

[Step S405] The database search module 34 extracts face position information having Pdeg that is second closest to the current Pdeg with respect to the direction specified by the Move_Next command.

[Step S406] The database search module 34 outputs Pdeg and Tdeg that are extracted from the face position database 31 in step S402 or step S405 to the pan/tilt control section 35 in order to control the tripod panhead 20, so that the camera 10 is directed towards the direction of the face corresponding to the face position information.

Furthermore, the zoom operation of the camera 10 is controlled using Zdeg that is extracted similarly. Here, in this embodiment, Zdeg within the face position database 31 is a value such that the square frame nearly equal to the size of the face detected by image recognition is photographed at the full screen. For this reason, the database search module 34 converts the value of the extracted Zdeg so that the corresponding face becomes a predetermined size within the screen, and outputs the value to the zoom control section 51 in order to control the zoom magnification ratio. For example, when the size of the face is set so that the length of one side of the square frame becomes ¼ of the width of the image and becomes ⅓ of the longitudinal length, Zdeg extracted from the face position database 31 should be set four times as large and should be output to the zoom control section 51.

In the processes of the above flowcharts, since, for example, control of the camera direction and the zoom operation in accordance with the PTZ command is performed in the vertical synchronization period immediately before, even when the current Pdeg, Tdeg, and Zdeg do not correspond to the face position information within the face position database 31, control based on the Move_Next command can be performed.

That is, the difference value between Pdeg of the adjacent face and the current Pdeg is compared with a threshold value (step S404). If the difference value is smaller, the amount of deviation of Pdeg is determined to be within a permissible range of error, the face position information having Pdeg closest to the specified direction is assumed to be the current amount of control, and control is performed so that the camera 10 is directed towards the next adjacent face in that direction (steps S405 and S406). Conversely, when the amount of deviation of Pdeg is larger, by controlling the camera direction using the face position information having Pdeg closest to the specified direction, it becomes possible for the operator to operate with a natural sense.

As has thus been described, in the camera system according to the first embodiment, the camera 10 scans the entire photographing range, detects the positions of the faces of the participants of a conference by an image recognition process, and registers the information in the face position database 31. For this reason, the operation for registering in advance the position information of the faces of the participants becomes unnecessary, the time and effort of the user can be omitted, and the convenience is improved.

Then, by extracting the face position information registered in the face position database 31 in accordance with the Move_Next command and by performing control, it is possible to project the face of the adjacently present person at a proper size at an accurate position within the screen with a simple operation using only the Move_Next key indicating the direction. Furthermore, for example, a number can be assigned in advance in descending order of Pdeg to the face position information of the face position database 31, so that the face of any desired person can be photographed by only specifying a number using the remote controller 40a.

Furthermore, when there is no request for changing the pan/tilt/zoom operation even during the normal operation, control is automatically performed so that the face currently being photographed may be projected in the center of the screen by image recognition. Therefore, it is possible to display a natural, high-quality image in the conference room of a transmission target.

Second Embodiment

Figure 8:
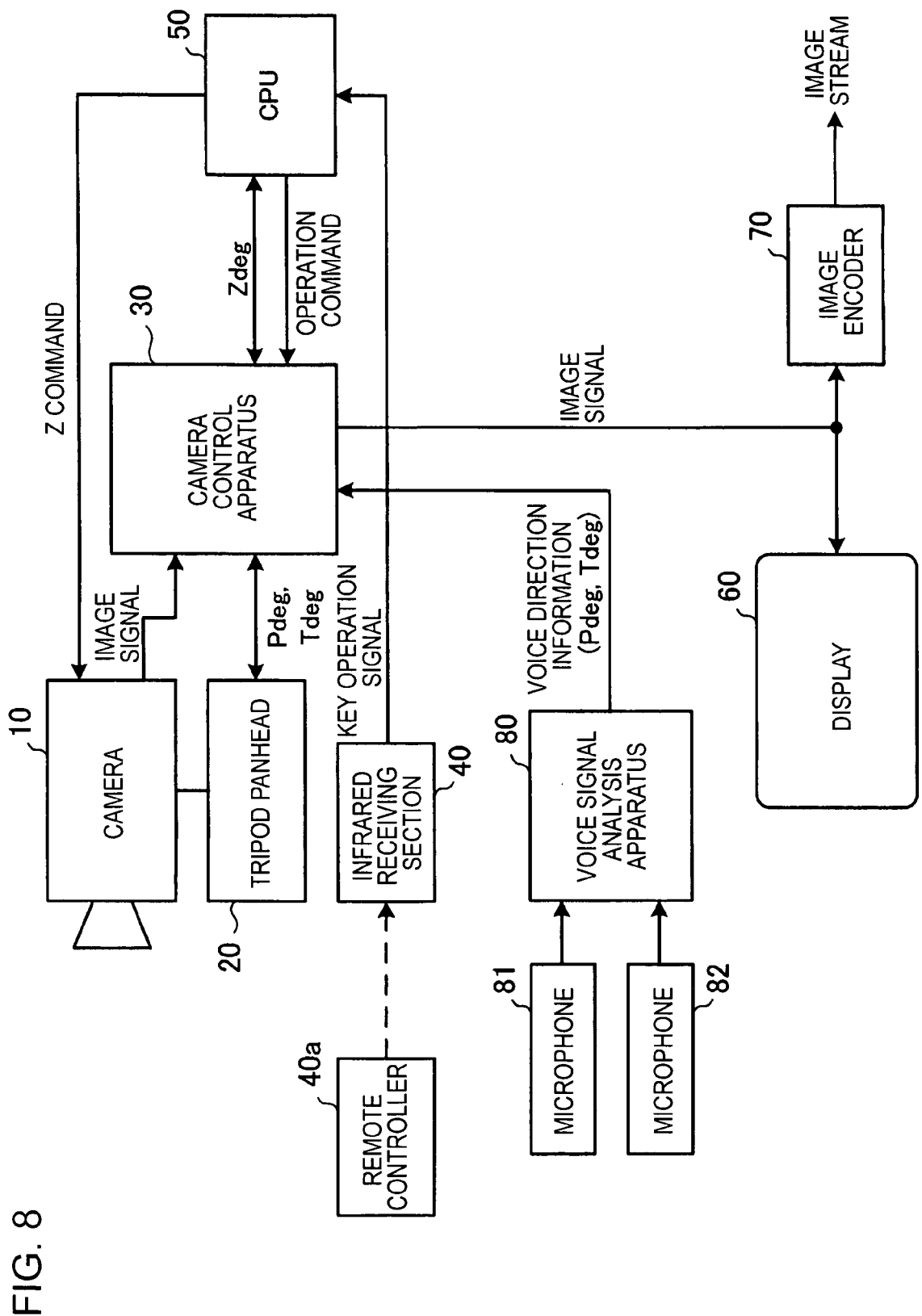
FIG. 8 shows a system configuration of a camera system according to a second embodiment of the present invention.

FIG. 8 shows a system configuration of a camera system according to a second embodiment of the present invention. Functions in FIG. 8 corresponding to those in FIG. 1 are designated with the same reference numerals, and accordingly, descriptions thereof are omitted.

The camera system shown in FIG. 8 includes, in addition to the configuration of the system shown in FIG. 1, a voice signal analysis apparatus 80, and two microphones 81 and 82. The microphones 81 and 82 collect voices of the participants in a conference room in which photographing is being performed by the camera 10, and the collected voice signal is input to the voice signal analysis apparatus 80. The voice signal analysis apparatus 80 extracts human voices from the two input audio signals, estimates the direction in which the voice is produced, and outputs voice direction information indicating the direction to the camera control apparatus 30. As a result, the camera control apparatus 30 specifies the direction of the participant who is speaking on the basis of the voice direction information, so that the camera 10 can be directed towards that direction. The voice direction information is given as, for example, values of Pdeg and Tdeg.

Figure 9:
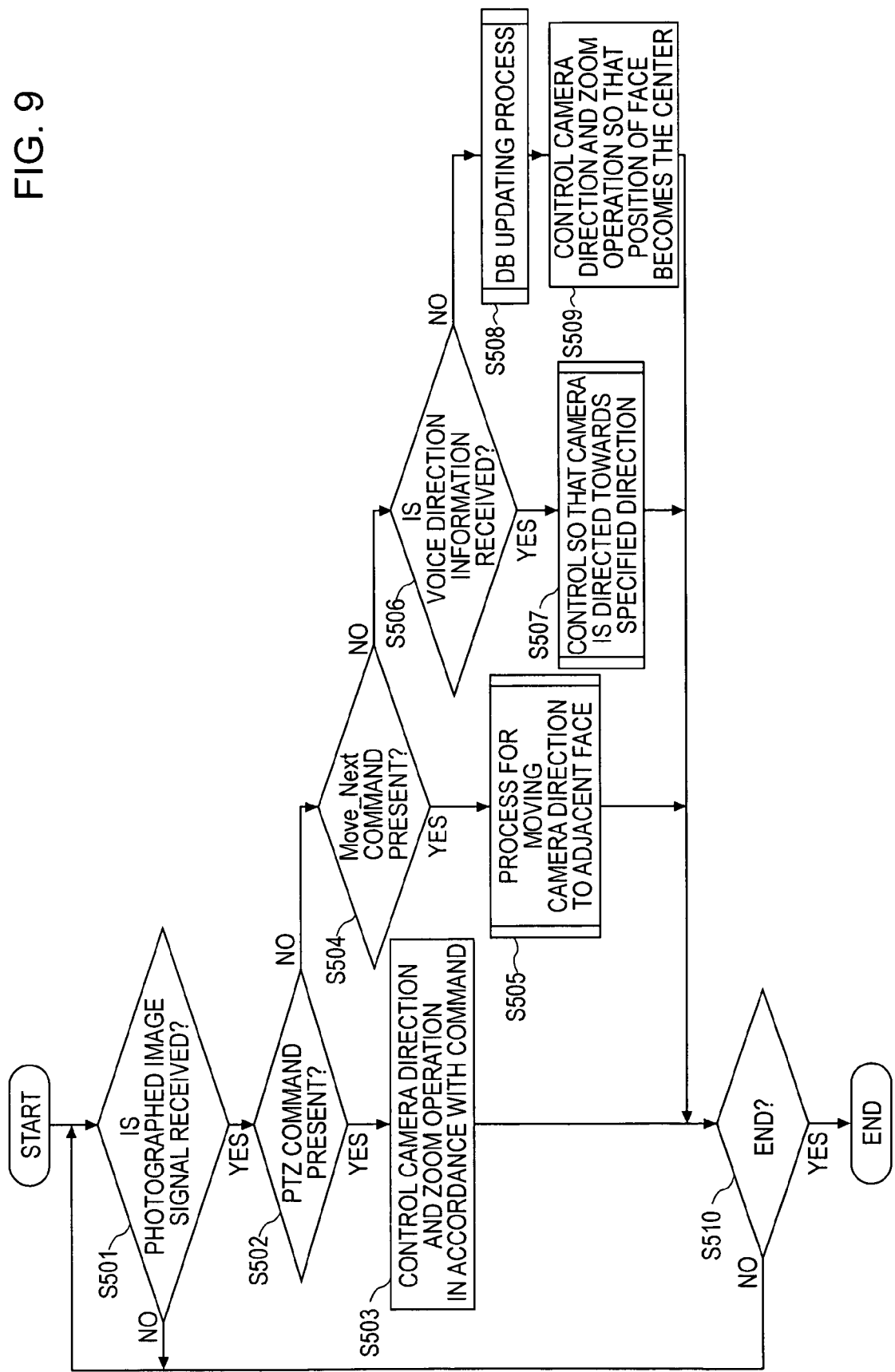
FIG. 9 is a flowchart showing the flow of the overall processing of the camera system according to the second embodiment of the present invention.

FIG. 9 is a flowchart showing the flow of the entire processing of the camera system according to the second embodiment of the present invention.

[Step S501] A photographed image signal for one frame is output by the camera 10, and the process waits for the face recognition module 32 to receive this signal. Then, when the signal is received, the process proceeds to step S502.

[Steps S502 and S503] These steps correspond to steps S103 and S104 of FIG. 4, respectively. That is, only when there is a PTZ command in an execution wait state, the process proceeds to step S503. In this step, the pan/tilt control section 35 and the zoom control section 51 receive a PTZ command from the PTZ command control section 52. The tripod panhead 20 is controlled in accordance with the PTZ command, the photographing direction of the camera 10 is changed for one step, and the zoom magnification ratio of the camera 10 is changed for one step. Thereafter, the process proceeds to step S510.

[Steps S504 and S505] These steps correspond to steps S105 and S106 of FIG. 4, respectively. That is, only when there is a Move_Next command in an execution wait state, the process proceeds to step S505, where the database search module 34 receives a Move_Next command from the Move_Next command control section 53, and the direction of the camera 10 is moved to photograph the face of the adjacent person in the direction specified by the command. Thereafter, the process proceeds to step S510.

[Step S506] When voice direction information is output from the voice signal analysis apparatus 80, the pan/tilt control section 35 receives this information (Pdeg, Tdeg), and the process then proceeds to step S507. When the voice direction information is not output, the process proceeds to step S508.

[Step S507] The pan/tilt control section 35 controls the tripod panhead 20 so that the camera 10 is directed towards the direction specified by the voice direction information. Thereafter, the process proceeds to step S510.

[Steps S508 and S509] These steps correspond to steps S107 and S108 of FIG. 4, respectively. That is, in step S508, the face recognition module 32 and the database updating module 33 perform a process for updating the face position database 31 by using image recognition with respect to the range currently being photographed. Then, in step S509, the database search module 34 extracts once more the face position information of the face currently being photographed from the updated face position database 31, controls the direction of the camera 10 so that the face is positioned in the center of the screen, and further controls the zoom operation so that the face on the screen becomes a predetermined size. Thereafter, the process proceeds to step S510.

[Step S510] The CPU 50 determines whether or not a request for completing the processing is made by, for example, a power-off operation. If not, the process returns to step S501.

In the processes in accordance with the above flowcharts, in addition to the process of FIG. 4, it is possible to automatically direct the camera 10 to the direction of the speaker in accordance with the voice direction information from the voice signal analysis apparatus 80 and possible to photograph the speaker. After the camera 10 is directed towards the speaker, if the PTZ command, the Move_Next command, and the voice direction information are not received, the processes of steps S508 and S509 are performed. For this reason, the face position information of the speaker and the person positioned in the vicinity of the speaker is automatically registered in the face position database 31. Furthermore, the direction of the camera 10 is automatically adjusted so that the face of the speaker is positioned in the center of the screen. Therefore, it becomes possible to photograph the face of the speaker accurately at a proper size without performing user operation. Furthermore, after the surrounding of the speaker is automatically photographed in accordance with the voice direction information, the photographing direction is accurately adjusted using the Move_Next key, and the process for updating the face position database 31 can also be performed.

Furthermore, if the above-described processes are used, as a result of, for example, all the participants sequentially uttering voice at the start of a conference, it becomes possible to automatically register the face position information of each participant in the face position database 31 and thereafter possible to perform a camera direction switching process using the Move_Next key and a process for automatically directing the camera 10 towards the face of any desired participant by number specification.

In the camera system of each of the above-described embodiments, the PTZ command and the Move_Next command may be received from a remote location via a communication line, and the photographing direction and the zoom operation of the camera 10 may be controlled in accordance with the received commands. This makes it possible to easily control the camera operation in a conference room from another conference room via a communication line. Furthermore, it becomes possible to easily control, in one place, the camera operation in a conference room at each location.

In each of the above-described embodiments, a case is described in which the camera system to which the present invention is applied is used in an electronic conference system. In addition, such a camera system can be used in applications where the switching of the camera direction is performed with a simple operation when, for example, video content for image recording media and for broadcasting is created.

It should be understood by those skilled in the art that various modifications, combinations, sub-combinations and alterations may occur depending on design requirements and other factors insofar as they are within the scope of the appended claims or the equivalents thereof.

What is claimed is:

1. A camera control apparatus for changing a photographing range of a camera including a driving apparatus for changing a photographing direction, the camera control apparatus comprising:
    a storage section storing, for each person of a plurality of persons to be photographed, face direction information when each face of the plurality of persons to be photographed by the camera is positioned in a central portion of a photographing range by the camera;
    a face position detection section configured to detect a position of a face of a person from a photographed image signal of the camera;
    a registration section configured to compute face direction information on the basis of a detection result by the face position detection section and information indicating a current photographing direction of the camera and registering the face direction information in the storage section;
    a driving control section configured to read face direction information corresponding to a person specified by an operation input from a user and controlling the driving apparatus in accordance with the face direction information in order to change the photographing direction of the camera; and
    an initial driving control section configured to control the driving apparatus so that an entire photographable range of the camera is divided and divided ranges are photographed in sequence by the camera.

2. The camera control apparatus according to claim 1, wherein, when the driving control section receives a direction indication signal for switching the photographing direction of the camera to an adjacent person to the left or right of a person being currently photographed, the driving control section extracts, from the storage section, the face direction information of another person closest to the person being currently photographed with respect to an indicated direction, and controls the driving apparatus by using the extracted face direction information.

3. The camera control apparatus according to claim 1, wherein, when the position of the face of the person is detected by the face position detection section, the registration section erases the face direction information contained in the current photographing range by the camera within the face direction information stored in the storage section, computes again the face direction information on the basis of the detection result by the face position detection section, and registers the face direction information in the storage section.

4. The camera control apparatus according to claim 1,
    wherein the face position detection section detects the position of the person from the photographed image signal of the camera with respect to the divided range, and the registration section computes the face direction information of the person, which is detected in the divided range, and sequentially registers the face direction information in the storage section, thereby automatically registering the face direction information of the persons present in the entire photographable range.

5. The camera control apparatus according to claim 1, wherein, when an operation input from a user for changing the photographing direction of the camera is not performed for a fixed time, the face position detection section detects the position of the face of the person from the current photographed image signal by the camera, the registration section erases, from the storage section, the face direction information contained in the current photographing range by the camera and thereafter registers, in the storage section, the face direction information of the person that is detected by the face position detection section, and the driving control section reads, from the storage section, face position information corresponding to the face closest to the center of the current photographing range, and controls the driving apparatus in accordance with the face position information in order to correct the photographing direction of the camera.

6. The camera control apparatus according to claim 1, wherein the face direction information comprises angle information with respect to the horizontal direction and the vertical direction, indicating the center position of the face of the person that is detected by the face position detection section.

7. The camera control apparatus according to claim 1, further comprising a zoom control section controlling the zoom magnification ratio of the camera, wherein the registration section registers face size information indicating the size of the face of the person that is detected by the face position detection section in the storage section in such a manner as to correspond to the face direction information, and on the basis of the face size information in the storage section, corresponding to the face direction information read by the driving control section, the zoom control section controls the zoom magnification ratio of the camera so that the face of the person to be photographed on the basis of the face direction information becomes a predetermined size within the photographing screen.

8. The camera control apparatus according to claim 7, wherein the face size information comprises viewing angle information when the camera photographs, at the entire screen, a minimum square range in which the face of the person detected by the face position detection section can be contained.

9. The camera control apparatus according to claim 1, further comprising an automatic driving control section configured to receive a detection signal from a voice detection apparatus for detecting a direction of voice uttered from a person to be photographed by the camera and to control the driving apparatus so that the camera photographs the direction indicated by the detection signal, wherein when the photographing direction of the camera is controlled by the automatic driving control section, the face position detection section detects the position of the face of the person from the photographed image signal of the camera, and the registration section erases, from the storage section, the face direction information contained in the current photographing range by the camera and thereafter registers the face direction information of the person that is detected by the face position detection section in the storage section.

10. A camera system, comprising:

a camera to photograph a plurality of persons;

a driving apparatus to change a photographing direction of the camera; and a camera control apparatus configured to control the driving apparatus, wherein the camera control apparatus includes a storage section storing, for each person to be photographed, face direction information when each face of persons to be photographed by the camera is positioned in the central portion of the photographing range by the camera;

a face position detection section configured to detect a the position of the face of a person from a photographed image signal of the camera;

a registration section configured to compute the face direction information on the basis of a detection result by the face position detection section and information indicating the current photographing direction of the camera and registering the face direction information in the storage section;

a driving control section configured to read, from the storage section, the face direction information corresponding to a person specified by an operation input from a user and controlling the driving apparatus in accordance with the face direction information in order to change the photographing direction of the camera; and an initial driving control section configured to control the driving apparatus so that an entire photographable range of the camera is divided and divided ranges are photographed in sequence by the camera.

11. An electronic conference system, comprising:

a camera system to photograph a plurality of persons;

a voice collection apparatus to collect a voice uttered from at least one person of a plurality of persons; and a transmission apparatus configured to multiplex an image signal from the camera system and an audio signal from the voice collection apparatus and to transmit the signals via a communication line, wherein the camera system includes a camera;

a driving apparatus to change a photographing direction of the camera; and a camera control apparatus configured to control the driving apparatus, wherein the camera control apparatus includes a storage section storing, for each person to be photographed, face direction information when each face of persons to be photographed by the camera is positioned in a central portion of the photographing range by the camera;

a face position detection section configured to detect a position of a face of a person from a photographed image signal of the camera;

a registration section configured to compute face direction information on the basis of a detection result by the face position detection section and information indicating a current photographing direction of the camera;

a driving control section configured to read, from the storage section, face direction information corresponding to a person specified by an operation input from a user and controlling the driving apparatus in accordance with the face direction information in order to change the photographing direction of the camera; and an initial driving control section configured to control the driving apparatus so that an entire photographable range of the camera is divided and divided ranges are photographed in sequence by the camera.

12. A camera control method for controlling a photographing range of a camera including a driving apparatus for changing a photographing direction, the camera control method comprising:

detecting a position of a face of a person from a plurality of persons to be photographed from a photographed image signal of the camera;

on the basis of the detection result by the detecting step and information indicating a current photographing direction of the camera, computing face direction information when each face of the plurality of persons to be photographed by the camera is positioned in the central portion of the photographing range by the camera and registering, for each detected person, the face direction information in a database;

reading, from the database, face direction information corresponding to a person specified by an operation input from a user and controlling the driving apparatus in accordance with the face direction information in order to change the photographing direction of the camera; and controlling the driving apparatus so that an entire photographable range of the camera is divided and divided ranges are photographed in sequence by the camera.

* * * * *